(12) United States Patent
Fraser et al.

(10) Patent No.: US 12,534,273 B2
(45) Date of Patent: Jan. 27, 2026

(54) CONTAINER AND A CLOSURE FOR A CONTAINER

(71) Applicant: THREADLESS CLOSURES LIMITED, Ketton (GB)

(72) Inventors: Anthony Henry Joseph Fraser, Ketton (GB); John Hein, Leeds (GB)

(73) Assignee: Threadless Closures Limited, Rutland (GB)

( * ) Notice: Subject to any disclaimer, the term of this patent is extended or adjusted under 35 U.S.C. 154(b) by 980 days.

(21) Appl. No.: 17/423,083

(22) PCT Filed: Jan. 15, 2019

(86) PCT No.: PCT/GB2019/050100
§ 371 (c)(1),
(2) Date: Jul. 14, 2021

(87) PCT Pub. No.: WO2019/141973
PCT Pub. Date: Jul. 25, 2019

(65) Prior Publication Data
US 2022/0081170 A1    Mar. 17, 2022

(30) Foreign Application Priority Data

Jan. 17, 2018   (GB) .................................... 1800740
Apr. 19, 2018   (GB) .................................... 1806400

(51) Int. Cl.
B65D 41/04        (2006.01)
B29D 99/00        (2010.01)
(Continued)

(52) U.S. Cl.
CPC ..... B65D 41/0442 (2013.01); B29D 99/0096 (2013.01); B65D 1/0246 (2013.01);
(Continued)

(58) Field of Classification Search
CPC ............ B65D 51/1688; B65D 51/1661; B65D 1/0246; B65D 41/0442; B67C 2003/227; B67C 7/00; B67C 3/22; B29D 99/0096
See application file for complete search history.

(56) References Cited

U.S. PATENT DOCUMENTS 2,772,013 A    11/1956  Stover
3,168,208 A *  2/1965   Stiff .................... B65D 41/0485
                                                215/334
(Continued)

FOREIGN PATENT DOCUMENTS

CN    106660670 A    5/2017
CN    108473239 A    8/2018
(Continued)

OTHER PUBLICATIONS

Machine translation of JP-2003252353-A (Year: 2003).*

*Primary Examiner* — Himchan Song
(74) *Attorney, Agent, or Firm* — Christensen, Fonder, Dardi & Herbert PLLC; Timothy J. Busse

(57) ABSTRACT

A container a side surface and a rim that defines an opening and an axis; a closure for the container; the container and closure having cooperating threads to move the closure axially as it is rotated; the closure having a seal against the side surface of the container; the thread portions of the container and closure are configured such that, as the closure rotates relative to the container, the seal moves parallel to the axis contacting three regions on the side surface of the container: a first region, configured such that, as the seal is moved across the region, the seal changes between states in which it is uncompressed and compressed between the container and closure; a second region, where the fluid bypasses part of the seal; and a third region where the seal forms a fluid-tight seal between the side surface and the closure.

20 Claims, 8 Drawing Sheets

(51) Int. Cl.
  *B65D 1/02* (2006.01)
  *B65D 51/16* (2006.01)
  *B67C 3/22* (2006.01)
  *B67C 7/00* (2006.01)
(52) U.S. Cl.
  CPC ............ *B65D 51/1661* (2013.01); *B67C 3/22* (2013.01); *B67C 7/00* (2013.01); *B67C 2003/227* (2013.01)

(56) References Cited

U.S. PATENT DOCUMENTS

| | | | | |
|---|---|---|---|---|
| 3,433,379 | A | * | 3/1969 | Feofanovich ...... B65D 43/0222 215/901 |
| 3,840,143 | A | * | 10/1974 | Davis ................. B65D 43/0231 206/520 |
| 2011/0174901 | A1 | | 7/2011 | Dettlaff et al. |
| 2017/0197764 | A1 | | 7/2017 | Hein et al. |
| 2018/0370694 | A1 | | 12/2018 | Fraser et al. |

FOREIGN PATENT DOCUMENTS

| | | | | | |
|---|---|---|---|---|---|
| DE | | 895998 | | 11/1953 | |
| GB | | 693074 A | * | 6/1953 | |
| GB | | 2529616 A | | 3/2016 | |
| GB | | 2545672 A | * | 6/2017 | ......... B65D 41/0442 |
| JP | H 02-059152 U | | | 4/1990 | |
| JP | H 08-156954 A | | | 6/1996 | |
| JP | | 2003252353 A | * | 9/2003 | |
| JP | | 2018-520963 A | | 8/2018 | |
| WO | WO 2006/000774 A1 | | | 1/2006 | |
| WO | WO 2011/151630 A1 | | | 12/2011 | |
| WO | WO 2014/006418 A1 | | | 1/2014 | |
| WO | WO-2016012810 A1 | * | | 1/2016 | ............. B65D 41/04 |
| WO | WO 2016/075471 A1 | | | 5/2016 | |
| WO | WO 2017/017415 A1 | | | 2/2017 | |
| WO | WO 2017/109463 A1 | | | 6/2017 | |

\* cited by examiner

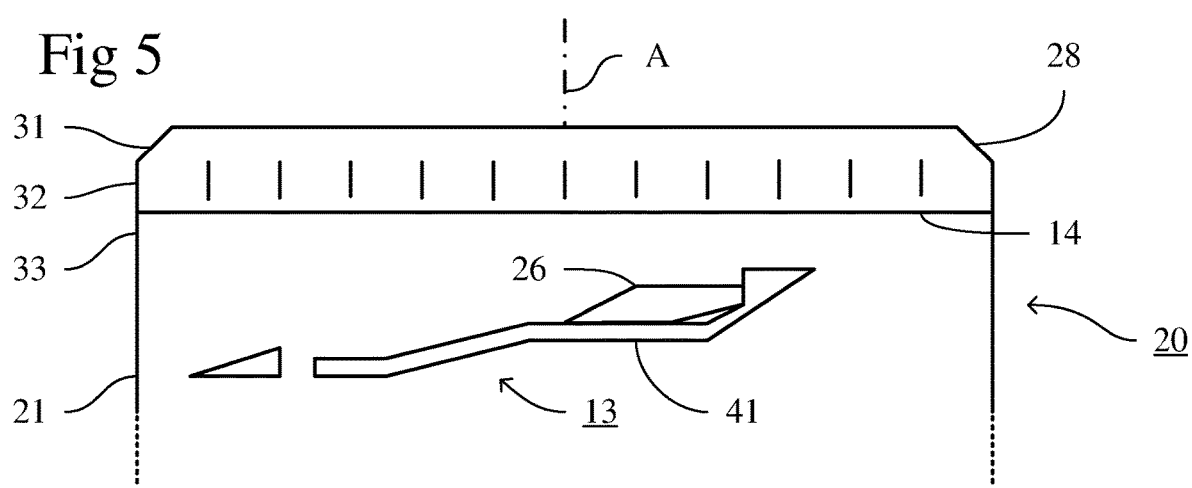
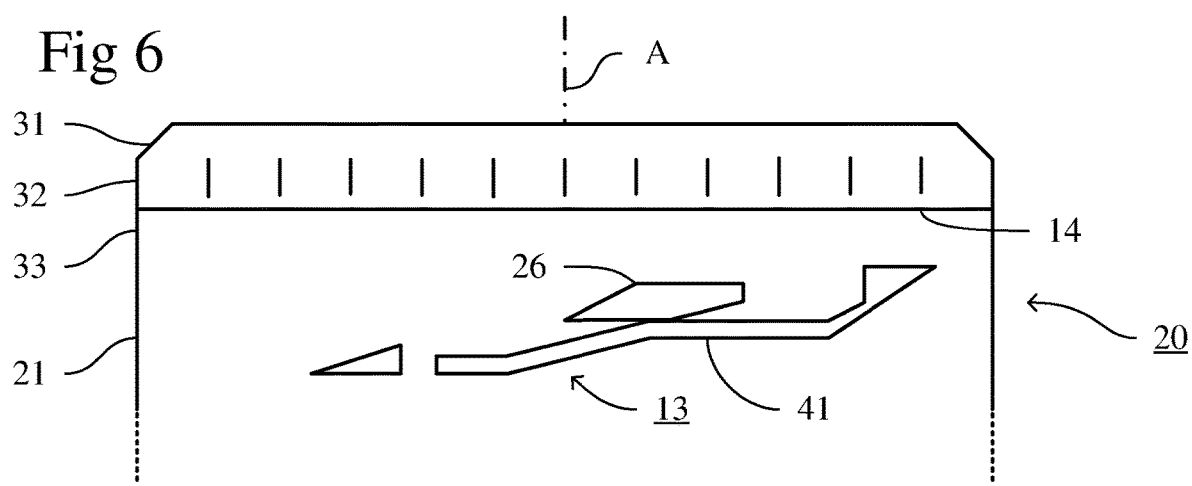
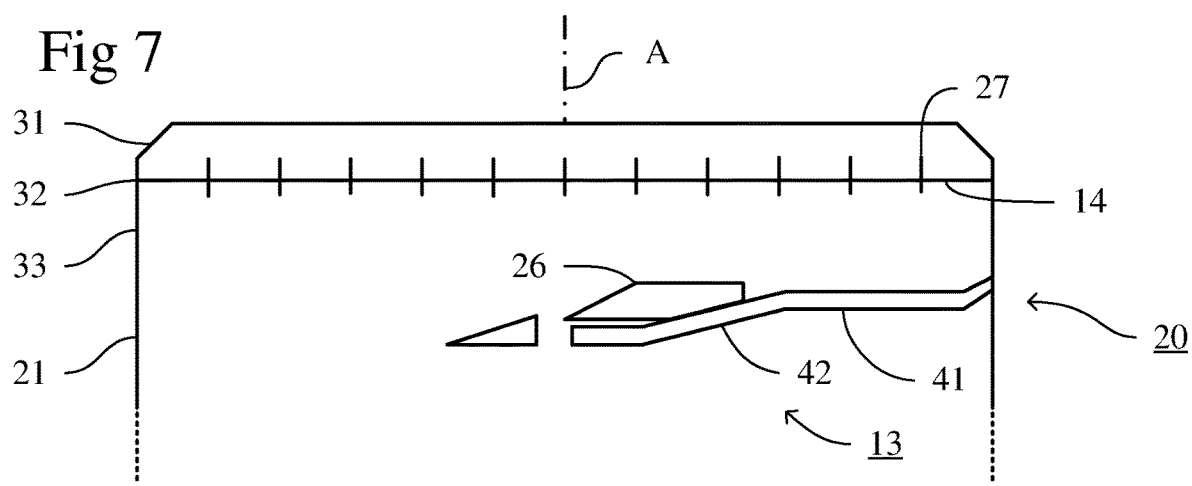

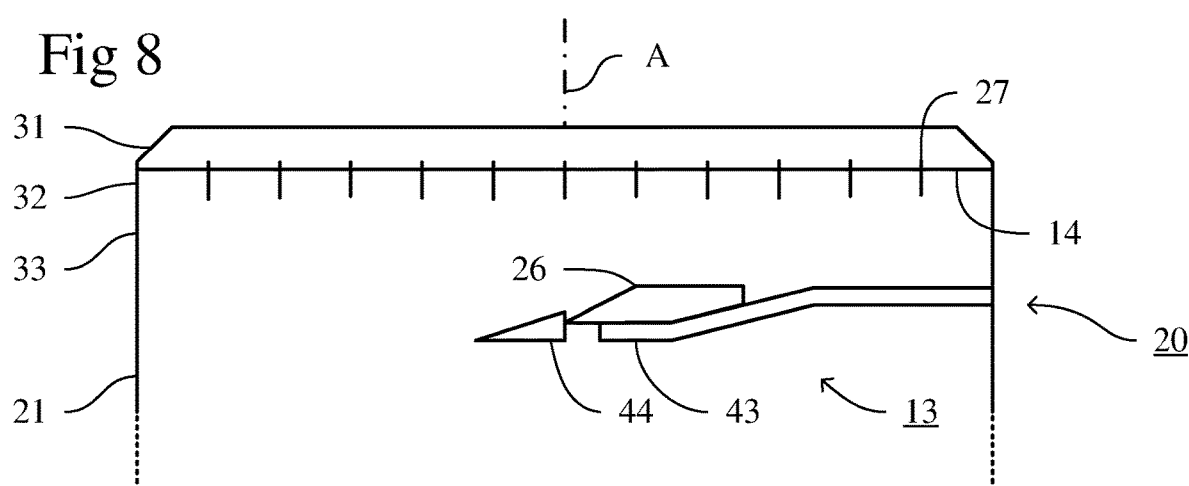
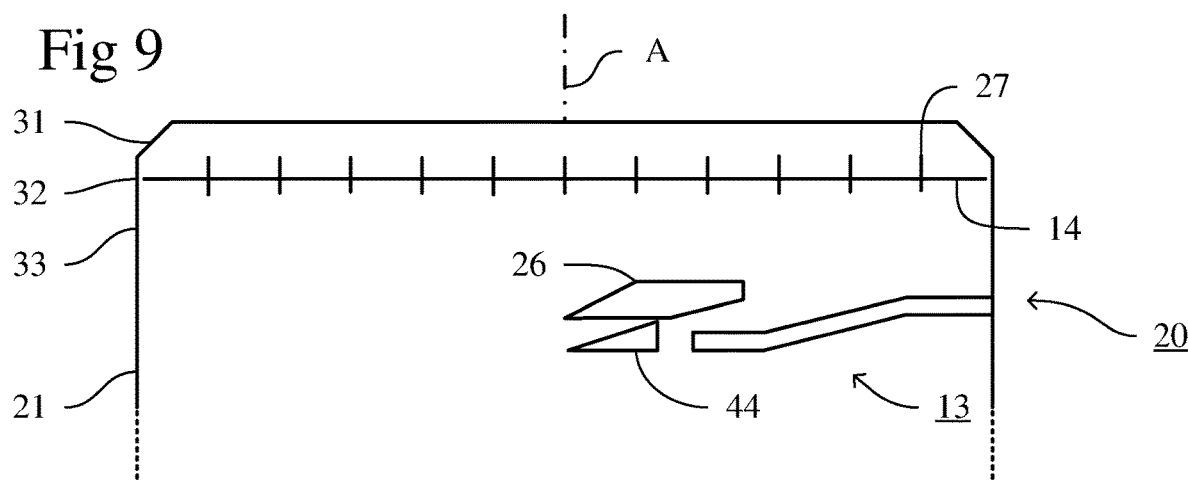
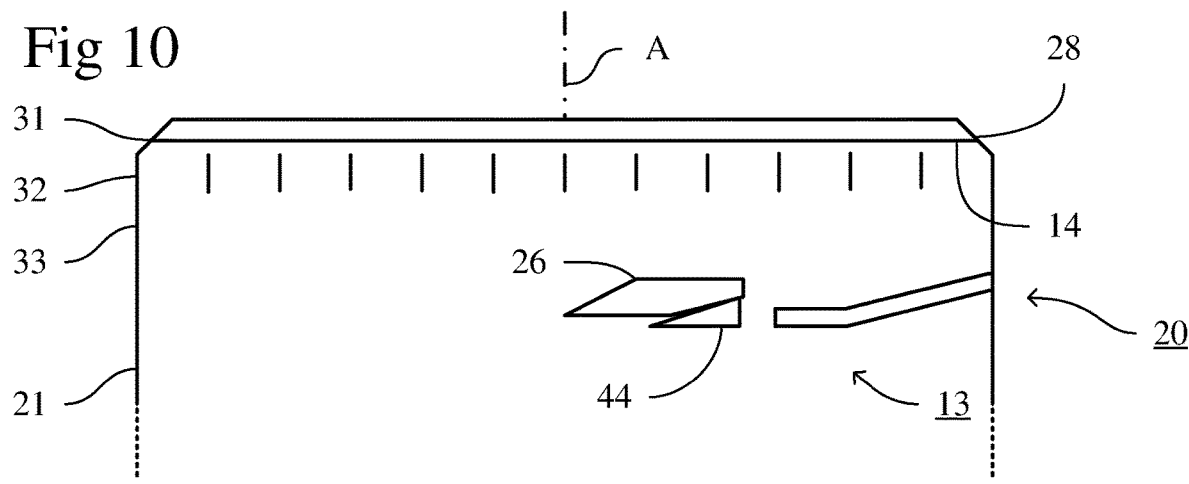

Fig 14
Fig 15
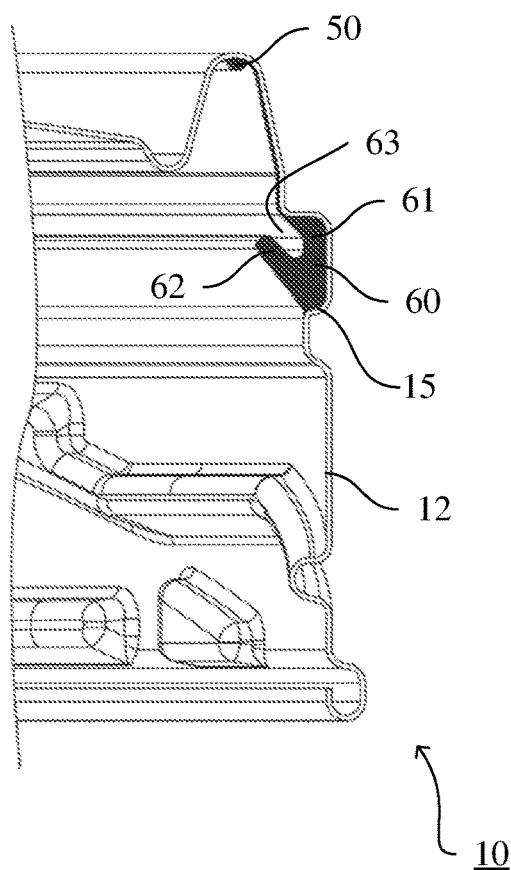
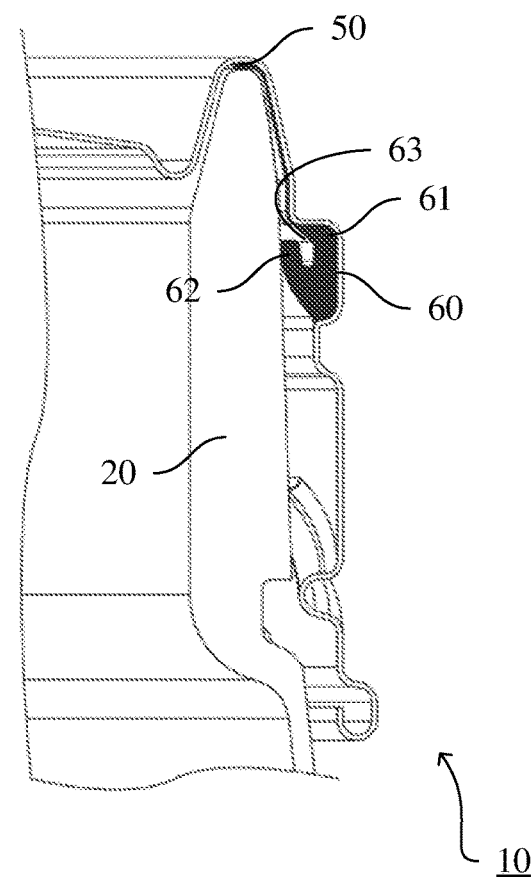

CONTAINER AND A CLOSURE FOR A CONTAINER

PRIORITY CLAIM

The present application is a National Phase entry of PCT Application No. PCT/GB2019/050100, filed Jan. 15, 2019, the disclosure of which is hereby incorporated by reference herein in its entirety.

FIELD OF THE INVENTION

The present disclosure relates to a container and a closure for the container. Such a container may be used to house a beverage or other liquid or fluid. A container may be of a variety of sizes and may, for example, be a wide-mouth container or it may be a bottle. In some cases, it may be designed for containing a carbonated beverage. The disclosure also relates to the container separately, a closure for use therewith, the manufacture of such a container and closure, the use of such a container and closure and a method of filling such a container and closure with a beverage.

DESCRIPTION OF THE PRIOR ART

Containers and closures for wide-mouth containers and bottles are known such as those described in the applicant's earlier applications, for example WO2006/000774, WO2011/151630, WO2014/006418, WO2017/109463 and WO2017/017415. These seek to provide a closure capable of securely closing a container, the contents of which may be at an elevated pressure, for example during transportation and/or when subject to elevated temperatures, whilst remaining relatively easy for a consumer to remove.

A wide-mouthed container may be used both to store a beverage (or other contents) and as a drinking vessel once the closure has been removed. In some cases, the closure may also be designed so it can be used to re-close and/or to re-seal the container. A typical wide-mouth container may have a mouth with a diameter or width in the range 55 to 65 mm, although the term may also apply to containers having a mouth with a diameter or width in the range 40 to 90 mm.

A bottle is typically used to store a beverage (or other contents) prior to pouring it into a drinking vessel. Commonly used bottles, such as those used to store beer and other beverages, typically have a mouth with a diameter of around 28 mm.

Whilst the closures described in the above documents are satisfactory in many cases, the present disclosure seeks to provide improvements in the user experience. In an arrangement such as that disclosed in the documents discussed above, the closure may include a seal that contacts the side surface of the container in order to seal the opening rather than, for example, the rim of the opening. When the closure is being removed from the container, particularly if the contents of the container is under pressure such as with a carbonated beverage, the seal may move suddenly at the point at which it releases contact with the container. This may be accompanied by a loud popping sound, which may be disconcerting for a user. In any arrangement, consideration must also be given to ensuring that a closure is not unintentionally released from a container, for example if knocked. It is therefore desirable to provide an arrangement of a container and closure that may provide a more satisfactory user experience.

SUMMARY OF THE INVENTION

According to an aspect of the disclosure, there is provided a container and a closure for a container, the container having a side surface and a rim that defines on opening and an opening axis that is perpendicular to the opening;

wherein the closure is configured to close the opening;

the container and closure have respective thread portions that cooperate to define movement of the closure relative to the container in a direction parallel to the opening axis as the closure rotates about the opening axis relative to the container;

the closure has a seal, configured to be able to form a fluid-tight seal against the side surface of the container;

the thread portions of the container are configured to provide at least a first thread, formed from separate thread portions to form at least one interrupted thread;

none of the thread portions of the container forming the at least one interrupted thread overlap other thread portions of the container;

the thread portions of the closure are configured to provide at least one continuous thread, arranged such that, when the closure closes the opening, the at least one continuous thread of the closure engages with the at least one interrupted thread of the container.

According to an aspect of the disclosure, there is provided a container and a closure for the container, the container having a side surface and a rim that defines an opening and an opening axis that is perpendicular to the opening;

wherein the closure is configured to close the opening;

the container and closure have respective thread portions that cooperate to define movement of the closure relative to the container in a direction parallel to the opening axis as the closure rotates about the opening axis relative to the container;

the closure has a seal, configured to be able to form a fluid-tight seal against the side surface of the container; and the thread portions of the container and closure are configured such that, as the closure rotates relative to the container, the seal is moved in a direction parallel to the opening axis to contact three regions on the side surface of the container: a first region, configured such that, as the seal is moved across the region, the seal changes between states in which it is uncompressed and compressed, respectively, between the container and closure; a second region, configured such that fluid can bypass part of the seal; and a third region in which the seal forms a fluid-tight seal between the side surface of the container and the closure.

In an arrangement such as that disclosed in the documents discussed above and in arrangements as discussed above, the closure may include a seal that contacts the external side surface of the container in order to seal the opening. It has now been identified that, in such an arrangement, a portion of a liquid stored in such a container may pass over the rim of the container and sit above the seal. When the closure is subsequently removed from the container, particularly if the contents of the container is under pressure such as with a carbonated beverage, the liquid resting on the seal may be released, for example onto the hand of a user removing the closure. This may be unpleasant for a user. It is therefore desirable to provide an arrangement of a container and closure that may provide a more satisfactory user experience.

According to an aspect of the disclosure, there is provided a container and a closure for the container, the container having a side surface and a rim that defines an opening and an opening axis that is perpendicular to the opening;

wherein
the closure is configured to close the opening;
the container and closure have respective thread portions that cooperate to define movement of the closure relative to the container in a direction parallel to the opening axis as the closure rotates about the opening axis relative to the container;
the closure has a first seal, configured to be able to form a fluid-tight seal against the side surface of the container; and
the closure has a second seal, configured to form a liquid-tight seal against the rim of the container when closure is attached to the container.

According to an aspect of the present disclosure, there is provided a method of forming a closure, comprising forming a main body of the closure having a top portion for covering the opening of the container and a skirt extending from the top portion; and
forming at least one of the first and second seals by co-moulding the at least one of the first and second seals to the main body.

According to an aspect of the present disclosure there is provided a container, for use with a closure to provide a container and a closure according to any of the above aspects, and a closure use with a container to provide a container and a closure according to any of the above aspects.

According to an aspect of the present disclosure there is provided a method of using a container and a closure according to any of the above aspects for containing a beverage and a method of filling a container with a beverage and connecting a closure to the container.

BRIEF DESCRIPTION OF THE DRAWINGS

Embodiments of the present disclosure will now be described, by way of example only with reference to the accompanying drawings, in which:
FIGS. 5 to 11 schematically depict the process of removing a closure from a container according to the present disclosure;
FIG. 14 schematically depicts, in cross-section, a closure with an alternative arrangement of seals;
FIG. 15 schematically depicts, in cross-section, the closure of FIG. 14 when attached to a container.

DETAILED DESCRIPTION

Figure 1:
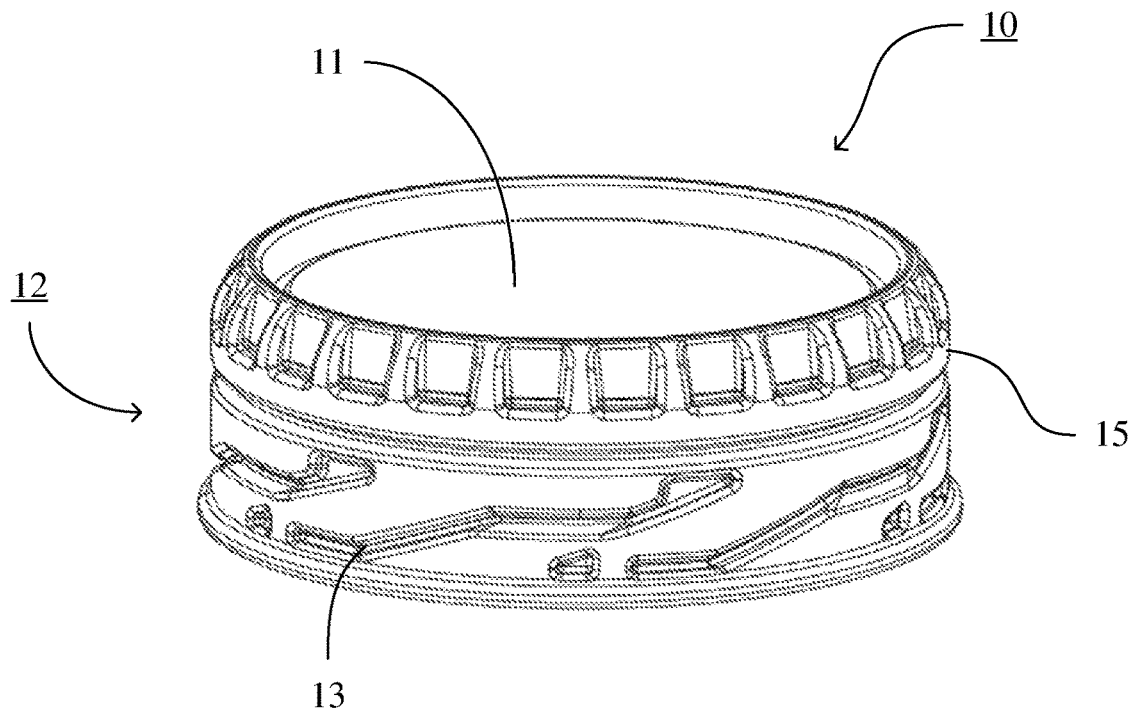
FIG. 1 shows an upper perspective view of a closure according to the present disclosure.
Figure 2:
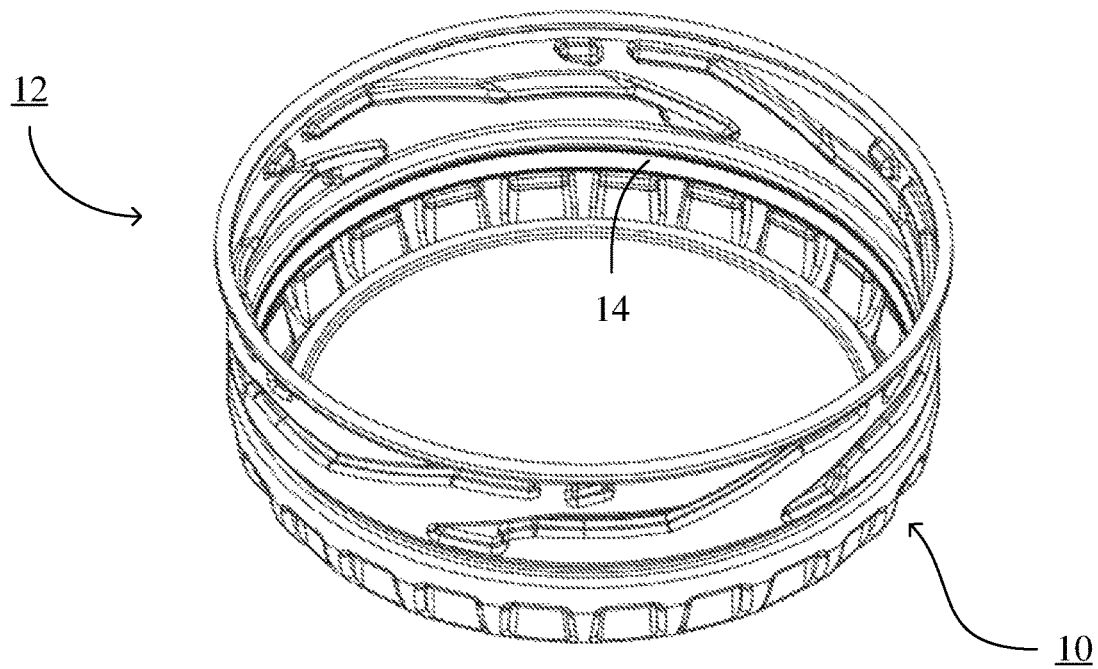
FIG. 2 shows a lower perspective view of a closure according to the present disclosure.

FIGS. 1 and 2 depict a closure 10 according to the present disclosure, with views from above/outside and below/inside, respectively.

As shown, the closure 10 includes a top portion 11 for covering an opening of a container, surrounded by a skirt 12 that extends from the top portion 11. The skirt 12 includes thread portions 13 that are configured to engage with thread portions of the container in order to define movement of the closure 10 relative to a container to which it is to be attached.

Figure 3:
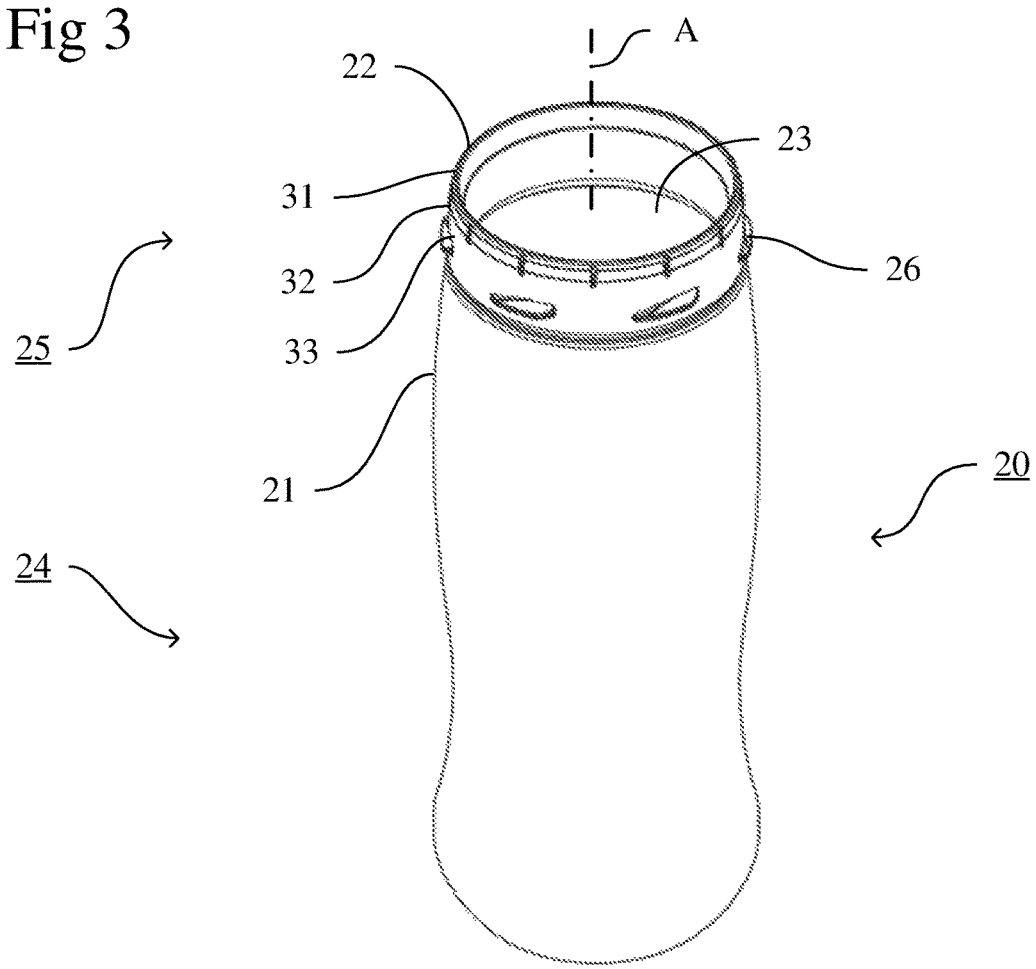
FIG. 3 shows a perspective view of a container according to the present disclosure.
Figure 4:
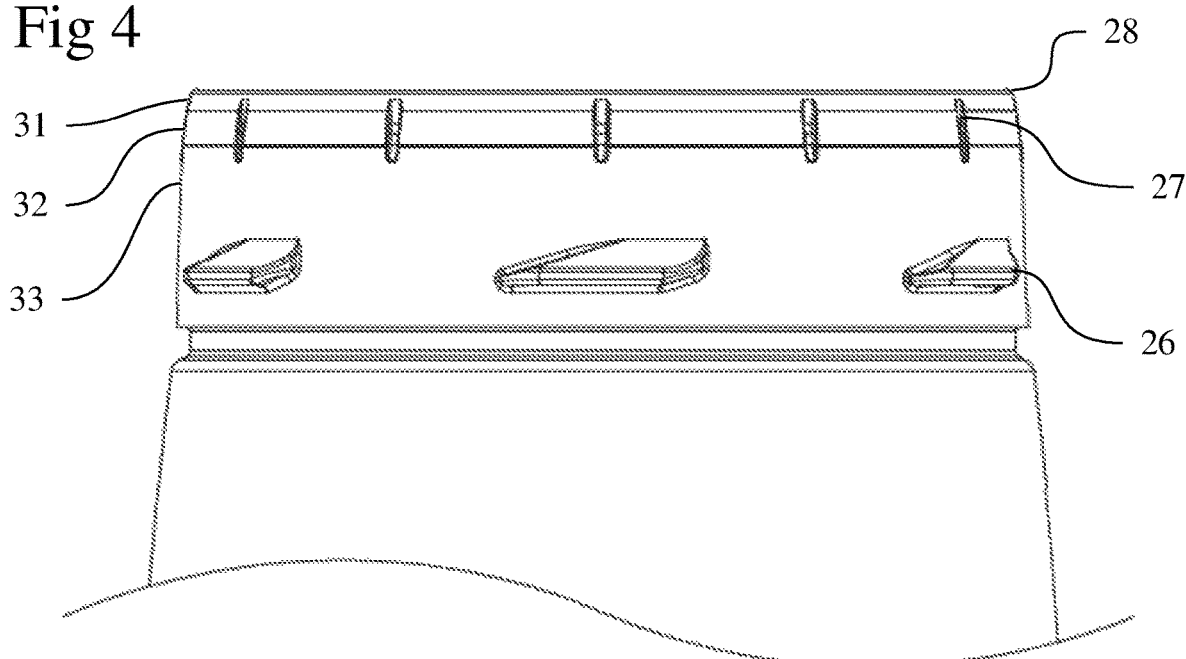
FIG. 4 shows in elevation the top part of the container of FIG. 3.

FIGS. 3 and 4 depict an example of a container 20 to be used with the closure 10 depicted in FIGS. 1 and 2. The container 20 includes an external side surface 21 and a rim 22 that defines an opening 23. The rim 22 also defines an opening axis A that extends perpendicularly to the plane within which the opening 23 lies. The container 20 includes another section 24, having a primary purpose to contain a beverage or liquid, and an upper portion 25, having a primary function to engage with a closure 10.

The container 20 includes thread portions 26, configured to engage with the thread portions 13 of the closure 10 in order to define the movement of the closure 10 relative to the container 20 while the closure 10 is being attached to the container 20 and/or while the closure 10 is being removed from the container 20.

As shown in the arrangement depicted in FIG. 2, the closure 10 may include a seal 14, secured to an inner surface of the closure 10. The closure 10, seal 14 and container 20 may be configured such that, when the closure 10 is attached to the container 20, the seal 14 provides a fluid-tight seal between the closure 10 and the container 20.

In an arrangement, the seal 14 may be formed from a different material from the closure 10. This may enable materials to be selected for each that have beneficial properties for their respective function. For example, it may be desirable for the seal 14 to be formed from a material that is more resilient than the material used to form the closure 10. In an example, the closure 10 may therefore be formed from a metal, which may not be suitable to form the seal 14.

As shown in the arrangement depicted in FIGS. 1 and 2, the seal 14 may be retained within a recess or gland 15 formed within the skirt 12 of the closure 10. The recess or gland 15 may be configured such that, as the closure 10 is advanced onto the container 20 in a direction parallel to the opening axis A, the position of the seal 14 relative to the closure 10 in that direction is substantially fixed, subject to small movements that may be caused by compression of the seal 14 and/or by manufacturing tolerances.

Accordingly, as the closure 10 moves relative to the container 20 in a direction parallel to the opening axis A, the seal 14 also moves in the same direction relative to the container 20. In an arrangement, the seal 14 is caused to move across three regions 31, 32, 33 of the side surface 21 of the container during the process of attaching the closure 10 to the container 20 and/or removing the closure 10 from the container 20.

In a first region 31, the arrangement of the closure 10 and the container 20 may be configured such that, as the seal 14 is moved across the first region 31 by the movement of the closure 10 relative to the container 20, the seal can be switched between states of compression. In one state, the seal 14 is compressed between respective surfaces of the closure 10 and the container 20. In an arrangement, the seal 14 may be compressed between the side surface 21 of the container and a surface of the recess or gland 15 within which the seal 14 is fitted. In another state, the seal 14 is not compressed, or not significantly compressed, namely not compressed to an extent that the seal 14 may be used in order to provide a fluid-tight seal.

In an arrangement, the closure 10 and container 20 may be configured such that in the process of attaching the closure 10 to the container 20, the seal 14 is caused to traverse the first region 31 of the side surface of the container 20 in a manner that results in the seal transitioning from an uncompressed state to a state in which it is compressed between the side surface 21 of the container 20 and an inner surface of the closure 10.

Conversely, in a process of detaching the closure 10 from the container 20, the movement of the closure 10 relative to the container 20 may cause the seal 14 to traverse the first region 31 of the side surface 21 of the container in such a way that the seal transitions from a compressed state to an uncompressed state.

As shown in FIG. 4, in the first region 31 of the side surface 21 of the container 20, the surface 28 may be inclined relative to the opening axis A. In an arrangement in which the opening 23 is circular, the inclined surface 28 may be frusto-conical. As the seal 14 traverses the region 31 including the inclined surface 28, the separation between the side surface 21 of the container 20 and the surface of the closure 10 against which the seal 14 is retained decreases. Consequently, as the seal 14 traverses the first region 31 of the side surface 21, the seal 14 is compressed.

In an arrangement, the angle of the inclined surface 28 relative to the opening axis A is in a range of 5 to 30°, optionally in a range of 10 to 20°.

In the arrangement depicted in FIGS. 3 and 4, in the second region 32 of the side surface 21 of the container 20, a plurality of grooves 27 are provided at locations spread around the side surface 21. When the seal 14 is positioned adjacent the second region 32 of the side surface 21 of the container 20, the grooves 27 permit fluid to bypass the seal 14, even if it is in a compressed state. This may permit, for example, high pressure gas to vent while the closure 10 is partially attached to the container 20. In an arrangement in which the closure 10 and container 20 are configured such that the seal 14 is in a compressed state when in contact with the second region 32 of the side surface 21 of the container 20, the venting of high pressure gases through the grooves 27 rather than between the rim 22 of the container 20 and the seal 14 may prevent the seal from moving rapidly causing a popping noise that may disturb the user.

It should be appreciated that any number of grooves 27 may be provided and the grooves 27 need not be evenly spaced around the side surface 21 of the container 20. Optionally, a single groove 27 may be provided. In an alternative arrangement, not depicted in the Figures, one or more ridges may be provided on the side surface 21 of the container 20 in the second region 32. Such ridges may disrupt the seal 14 from forming a fluid-tight seal against the side surface 21 of the container 20. In particular, venting paths bypassing the seal 14 may be provided on either side of such ridges.

In the third region 33 of the top part 25 of the container 20, the side surface may be configured such that the seal 14 may form a fluid-tight seal between the container 20 and the closure 10, thereby containing a fluid, such as a beverage, within the combination of the container 20 and closure 10.

In an arrangement, the side surface 21 of the container 20 in the third region 33 may be cylindrical or substantially cylindrical, arranged about the opening axis A. The same may apply in the second region 32 of the side surface 21 of the container 20, excluding any grooves and/or ridges used to form a bypass path for fluid around the seal.

Such an arrangement may ensure that, at any position of the seal 14 within the second and/or third region 32, 33 of the side surface 21 of the container 20, the separation between the side surface 21 of the container and the surface of the closure 10 adjacent the seal is substantially the same. This may ensure consistent compression of the seal 14, ensuring a fluid-tight seal, excepting any bypass path within the second region 32.

In an arrangement, the side surface 21 of the container 20 in the second and/or third region 32, 33 may be at a small angle relative to the opening axis A. This may assist in the release of the top section 25 of the container 20 from a mould used in the forming process. In such an arrangement, the third region 33 of the side surface 21 of the container 20 may be configured such that a line within the surface is at an angle to the opening axis A of less than 5°, optionally less than 3°. The second region 32 of the side surface 21 of the container 20 may be configured such that a line within the surface is at an angle to the opening axis A of less than 10°, optionally in a range of 2 to 10°. The line may be the line at which a tangent plane contacts the curved surface of the side surface 21 of the container 20 in the second and/or third region 32, 33.

In an arrangement in which the side surface 21 of the container 20 in the second and/or third region 32, 33 is slightly inclined, it should be appreciated that the change in separation between the side surface 21 and the surface of the closure 10 adjacent the seal 14 may be sufficiently small across the second and/or third regions 32, 33 that the change in the extent of the compression of the seal 14 is not significant.

In an arrangement, the side surface 21 of the container 20 may be less inclined in the third region 33 than in the second region. This may enable a gradual transition from the third region 33 with least or no angle relative to the opening axis A, through the second region 32, to the first region 31 which, as above, may include an inclined surface 28 used to compress the seal 14 when the closure 10 is attached to the container 20. This may result in an improved sensation for the user. Alternatively or additionally, the side surface 21 of the container 20 may be less inclined in the second region 32 than in the first region. Again, this may result in an improved sensation for the user.

FIGS. 5 to 11 schematically depict the engagement of the thread portions 13, 26 on the closure 10 and container 20, respectively, during the process of removing a closure 10 from a container 20. In the images shown, the container 20 and its side surface 21 and a thread portion 26 are shown in a fixed position. For clarity, the closure 10 itself is not shown but the relative position of a thread portion 13 of the closure 10 and seal 14, both of which have a substantially fixed position relative to the remainder closure 10, are shown.

In the depiction, as the closure 10 rotates about the opening axis A relative to the container 20, the depicted thread portion 13 gradually becomes not visible. However, the seal 14 which surrounds the closure 10 remains visible in all of the Figures. It should be appreciated that, in practice, a closure 10 may have multiple sets of thread portions 13 such that, as one becomes not visible as it rotates around the opening axis A, another would become visible. However, for the clarity of this depiction, only a single thread portion 13 is depicted.

As shown in FIG. 5, in a fully closed position, a first part 41 of the thread portion 13 of the closure 10 is initially held beneath a thread portion 26 of the container 20. In this position, the seal 14 is located within the third region 33 of the side surface 21 of the container 20. Accordingly, a fluid-tight seal may be maintained.

As shown in FIG. 6, when the closure 10 is rotated about the opening axis A relative to the container 20, for an initial angle of rotation, the first part 41 of the thread portion 13 of the closure 10 remains below the thread portion 26 of the container 20. This maintains the position of the closure 10 relative to the container 20 in a direction parallel to the opening axis A. Accordingly, the seal 14 remains within the third region 33 of the side surface 21 of the container 20, maintaining a fluid-tight seal.

As shown in FIG. 7, as the closure 10 is rotated about the opening axis A relative to the container 20 further, the engagement between the thread portion 26 of the container 20 and the thread portion 13 of the closure 10 moves to a second part 42 of the thread portion 13 of the closure 10. The second part 42 of the thread portion 13 of the closure 10 is inclined relative to the first part 41, such that, as the closure 10 rotates, it also moves in a direction parallel to the opening axis A. This motion moves the seal 14 from the third region 33 to the second region 32 of the side surface 21 of the container 20. As discussed above, when the seal 14 is in contact with the second region 32 of the side surface 21 of the container 20, high pressure fluid, such as gas from a carbonated beverage, may be vented by bypassing the seal 14 through grooves 27.

As discussed above, in an arrangement, when the seal 14 is in contact with both the second and third regions 32, 33 of the side surface 21 of the container 20, the seal may remain in a compressed state. In such an arrangement, returning the seal 14 from the second region 32 to the third region 33 does not require compression of the seal 14. In such an arrangement, a user may easily move a closure 10 from a position in which the seal 14 is in contact with the second region 32 to a position in which the seal 14 is in contact with the third region 33 of the side surface 21 of the container 20.

This may be beneficial if a user experiences excessive venting when first opening the closure 10, for example if the beverage within the container 20 is a carbonated beverage. In such an instance, the user may easily rotate the closure 10 relative to the container 20 in the opposite direction to the opening direction, returning the seal 14 to the third region 33, in which it forms a fluid-tight seal, stopping the flow of fluid through the venting grooves 27.

As shown in FIG. 8, where the closure 10 continues to be rotated relative to the container 20, it may reach a position in which a third part 43 of the thread portion 13 of the closure 10 engages with the thread portion 26 of the container 20 to prevent further movement of the closure 10 relative to the container 20 in a direction parallel to the opening axis A in a direction resulting in the removal of the closure 10 from the container 20.

A fourth part 44 of the thread portion 13 of the closure may be configured to initially restrict the closure 10 from rotating further relative to the container 20 about the opening axis A, as shown in FIG. 8. The closure 10 and container 20 may be configured such that, in this position, the seal 14 remains in the second region 32 of the side surface 21 of the container 20. This may assist in completing the venting of any high pressure fluid before the closure 10 is fully removed from the container 20.

In such an arrangement, a user may be required to push the closure 10 back towards the container 20 in a direction parallel to the opening axis A at the same time as rotating the closure 10 about the opening axis A in order for the fourth part 44 of the thread portion 13 of the closure 10 to clear the thread portion 26 of the container 20, as shown in FIG. 9.

As shown in FIG. 10, on further rotation of the closure 10 relative to the container 20 about the opening axis A, engagement of the fourth part 44 of the thread portion 13 of the closure 10 with the thread portion 26 of the container 20 results in the seal 14 traversing the first region 31 of the side surface 21 of the closure 20. As discussed above, as the seal traverses the first region 31, the seal 14 transitions from a compressed state to an uncompressed state.

Figure 11:
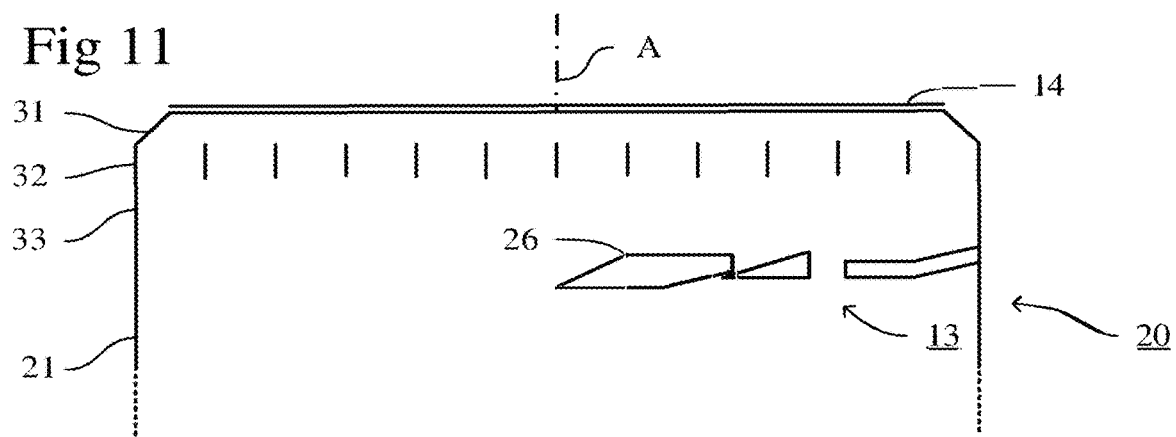

Upon further rotation, the thread portion 13 of the closure 10 disengages with the thread portion 26 of the container 20, with the result that the closure 10 may be completely removed from the container 20, as shown in FIG. 11.

It will be appreciated that in order to connect a closure 10 to a container 20, the above steps are reversed and the closure 10 is rotated in the opposite direction relative to the container 20 about the opening axis A. During such a closure process, the seal 14 is compressed as it traverses the first region 31 of the side surface 21 of the container 20. Thereafter, the seal 14 may remain compressed as it traverses the second region 32, in which venting may take place by relatively high pressure fluids bypassing the seal 14 through grooves 27. After further rotation, the seal 14 transfers to the third region 33 of the side surface 21 of the container 20, in which it may form a fluid-tight seal between the closure 10 and the container 20.

In an arrangement that differs from the arrangement discussed above, one or more of the grooves 27 may extend into the first region 31 of the side surface 21 of the container 20. In such an arrangement, venting may take place while the seal 14 is being compressed or released from compression as a closure 10 is being attached to, or removed from, respectively, a container 20.

In the above described arrangements, the seal 14 is described as being compressed during the process of attaching a closure 10 to a container 20. The seal 14 may be made from a resilient material. In an arrangement, the seal 14 may be formed from an O-ring, namely a gasket formed from a loop of material with a round cross-section. Alternative sealing arrangements may be used, for example gaskets having a different cross-section, including an D-ring, a U-ring, V-ring or a square-ring. Other known compressible seals may also be used.

Such seals 14, compressed between a side surface of the container 20 and the skirt 12 of the closure 10, rather than merely forming a compression seal on, for example, the rim 22 of the container 20 may provide a very reliable seal, especially for pressurised contents within the container 20, such as carbonated beverages. In such a scenario, it should be appreciated that a pressure difference is established between the contents of the container 20 and the environment surrounding the container 20. This pressure difference acts across the seal 14. However, the pressure difference across the seal 14, in a direction that promotes leakage from the container 20, results in the seal 14 deforming, for example from the gland or recess in which it sits, into the gap between the container 20 and the closure 10, more firmly filling the gap. This increases the ability of the seal 14 to resist leakage. As a result, the greater the pressure of the contents of the container 20, the better the seal 14 performs at resisting leakage.

As explained above, when the closure 10 is secured on the container 20, the seal 14 engages with the side surface of the container 20 at a location set apart from the rim 22 of the container. For example, the seal 14 may be positioned below the grooves 27 in the arrangement shown in FIG. 4. The thread portions 26 of the container 20, that are configured to engage with the thread portions 13 provided on the skirt 12 of the closure 10, are provided below this region. Accordingly, the thread portions 26 of the container 20 may be separated from the rim 22 of the container 20. For example, the space between the thread portions 26 of the container 20 and the rim 22 of the container may be at least two or three times the space occupied by the thread portions 26 on the surface of the container 20. In an arrangement, this separation of the thread portions 26 on the container 20 from the rim 22 of the container may be configured to provide sufficient space that, when a user drinks from the container 20, their lips do not touch the thread portions 26 of the container 20. This may enhance the user's satisfaction of drinking from the container 20.

One or both of the closure 10 and container 20 may be formed from a metal. Alternatively or additionally, one or both of the closure 10 and container 20 may be formed from a non-metallic material, such as a plastic material.

It should be appreciated that, although the above description relates to an arrangement in which the seal 14 of the closure 10 engages with the external side surface 21 of the container 20, in an arrangement, the seal 14 of the closure 10 may engage with the inner side surface of the container 20. In such an arrangement, the closure 10 may include an inner skirt configured such that, in a closed position, the skirt extends inside the opening of the container 20. In such an arrangement, the seal may form a fluid-tight seal between the inner skirt closure 10 and the inner side surface of the container 20. In such an arrangement, the closure 10 may have an outer skirt having thread portions that engage corresponding thread portions provided on the exterior side surface of the container 20.

Figure 12:
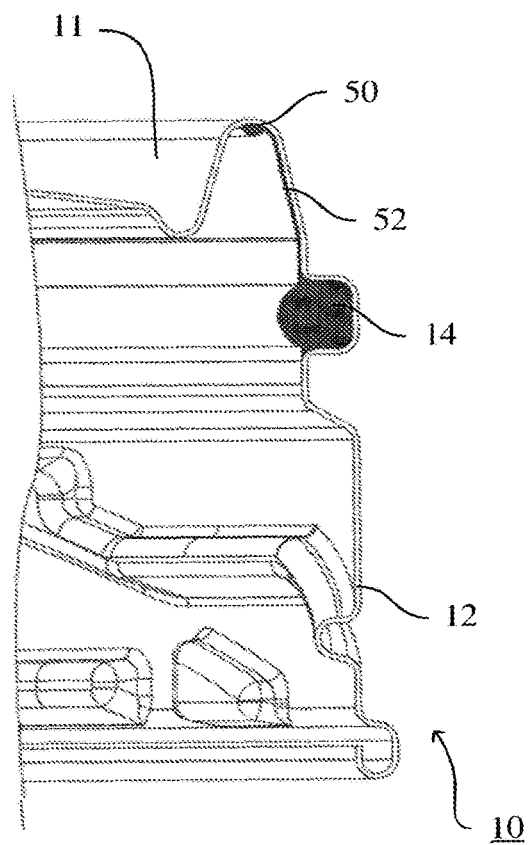
FIG. 12 schematically depicts, in cross-section, a closure with an arrangement of seals.
Figure 13:
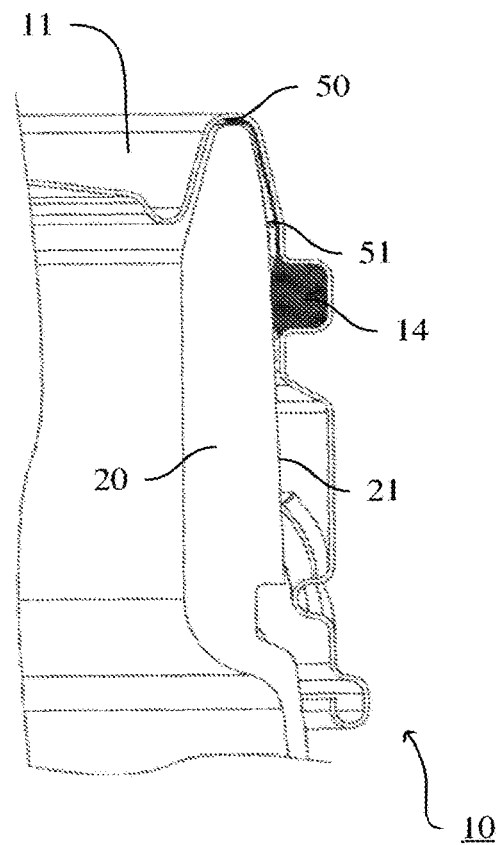
FIG. 13 schematically depicts, in cross-section, the closure of FIG. 12 when attached to a container.

FIGS. 12 and 13 schematically depict a closure 10 having a variation of the sealing arrangement discussed above. As shown, in addition to the first seal 14, that may provide a gas-tight seal between the closure 10 and the container 20 and that acts against the side surface 21 of the container, the closure may include a second seal 50. The second seal 50 may form a compression seal or a flexing seal against the rim 22 of the container 20.

As shown in the arrangement depicted in FIGS. 12 and 13, the second seal 50 may act against the uppermost surface of the rim 22 of the container 20. In an arrangement, the second seal 50 may alternatively or additionally act against an inner and/or outer surface of the rim 22 of the container, for example in a region slightly below the uppermost surface of the rim 22. In an arrangement, the second seal 50 may act against a tapered inner or outer surface of the rim 22.

In an arrangement, the first seal 14 may provide the primary gas-tight seal when the closure 10 is attached to the container 20, for example providing a sufficient seal to maintain the condition of a carbonated beverage. The second seal 50 may function to prevent any liquid from within the container 20 passing over the rim 22 to a position in which it rests on top of the first seal 14.

In an arrangement, the second seal 50 may not be sufficient to provide a gas-tight seal. Accordingly, the gas pressure in a region 51 between the first seal 14 and the second seal 50 may equalise with the gas pressure within the main body of the container 20. However, the second seal 50 may be sufficient to prevent liquid passing over the rim 22 of the container 20. Preventing or minimising the presence of liquid above the first seal 14, namely in the space 51 between the first seal 14 and the second seal 22 may prevent an undesirable leakage of liquid during removal of the closure 10 from the container 20, which may be particularly problematic for liquids stored under pressure.

In an arrangement, the first seal 14 and the second seal 50 may be integrally formed, namely formed at the same time from the same material. In an arrangement, as depicted in FIGS. 12 and 13, the first seal 14 and the second seal 50 may be connected by a relatively thin web 52, which facilitates forming the first seal 14 and the second seal 50 at the same time and/or may facilitate mounting the seals 14, 50 within the closure 10. In an arrangement, the first seal 14, the connecting web 52 and the second seal 50 may be integrally formed as a single component.

In an arrangement, at least one of the first seal 14 and the second seal 50 may be co-moulded to the closure 10. In such a process, also referred to as over-moulding, the main body of the closure 10, including the top portion 11 that covers the opening of the container 20 and the skirt 12 that extends from the top portion 11 may be formed first by any suitable process, depending on the material to be used. Subsequently, at least one seal 14, 50 may be formed within the closure 10 such that the already-formed closure 10 forms part of the mould within which the at least one seal 14, 50 is formed. For an arrangement such as that depicted in FIG. 12, the first seal 14, web 52 and second seal 50 may be formed in a single injection moulding process in which the main body of the closure 10 provides part of the mould.

Such a process may be beneficial because the co-moulding process may result in at least one of the first and second seals 14, 50 adhering to the main body of the closure 10. This may result in a closure 10 that is more robust to handling, namely less likely for either of the seals to become detached from the remainder of the closure 10. Alternatively or additionally, by co-moulding at least one of the seals 14, 50 to the main body of the closure 10, it may be possible to reduce or eliminate the possibility of voids being present between the seals 14, 50 and the main body of the closure 10. Such voids may be undesirable, for example for a container 20 and closure 10 to be used to hold liquids such as beverages because such voids may be difficult to clean and/or may provide spaces in which undesirable microbial activity may occur.

Although at least one of the first seal 14 and the second seal 50 may be co-moulded to the main body of the closure 10, in an arrangement at least one of the first seal 14 and the second seal 50 may be formed separately from the main body of the closure 10 and subsequently attached to the remainder of the closure 10. In such an arrangement, a seal 14, 50 may, as discussed above, fit within a suitably sized gland or recess 15, which may be sufficient to hold the seal 14, 50 in place. In an arrangement, at least one of the seals 14, 50 may be attached to the main body of the closure 10 by an adhesive.

FIGS. 14 and 15 depict a variation of the arrangement shown in FIGS. 12 and 13. Much of the arrangement depicted in FIGS. 14 and 15 corresponds to that shown in FIGS. 12 and 13 and the description thereof will not be repeated. It should also be appreciated that the variations to the arrangements shown in FIGS. 12 and 13 discussed above also apply to the arrangement depicted in FIGS. 14 and 15.

As is shown in FIG. 14, the difference between the arrangements is that in FIG. 14 the first seal 60 is a U-ring or V-ring rather than the D-ring shown in FIG. 12. As is shown in FIG. 14, the U-ring 60 may be arranged to include a first limb 61 that may fit within the recess or gland 15 within the skirt 12 of the closure 10. The U-ring 60 may also include a second limb 62 that at one end is connected to the first limb 61 but at the other end is separated from the first limb 61 by a space 63. The second limb 62 may project towards the centre of the closure 62, namely towards the opening axis A. As shown in FIG. 15, when the closure 10 is attached to the container 20, the first limb 62 of the U-ring 60 may deform to move closer to the first limb 61, reducing the size of the separation 63 between them.

Although as shown in FIGS. 14 and 15, the second limb 62 of the U-ring 60 projects generally inwards and upwards in the usual configuration of the closure 10, it should be appreciated that this may be reversed and the second limb 62 may generally project inwards and downwards.

As discussed above, at least one of the first seal 14 and the second seal 50 may be formed from a resilient material. In an arrangement, at least one of the first seal 14 and the second seal 50 may be formed from a cross-linked rubber. Such a material may beneficially provide a better seal, namely one that is more resistant to gradual release of gas stored under pressure than other choices of seal material such as synthetic elastomers including thermoplastic elastomers (commonly referred to as TPEs). The use of a cross-linked rubber may also be beneficial because it can be deformed to a greater extent during the process of removing it from a mould and still return to the desired shape. This may facilitate the formation of a seal 60 such as that depicted in FIGS. 14 and 15.

Figure 16:
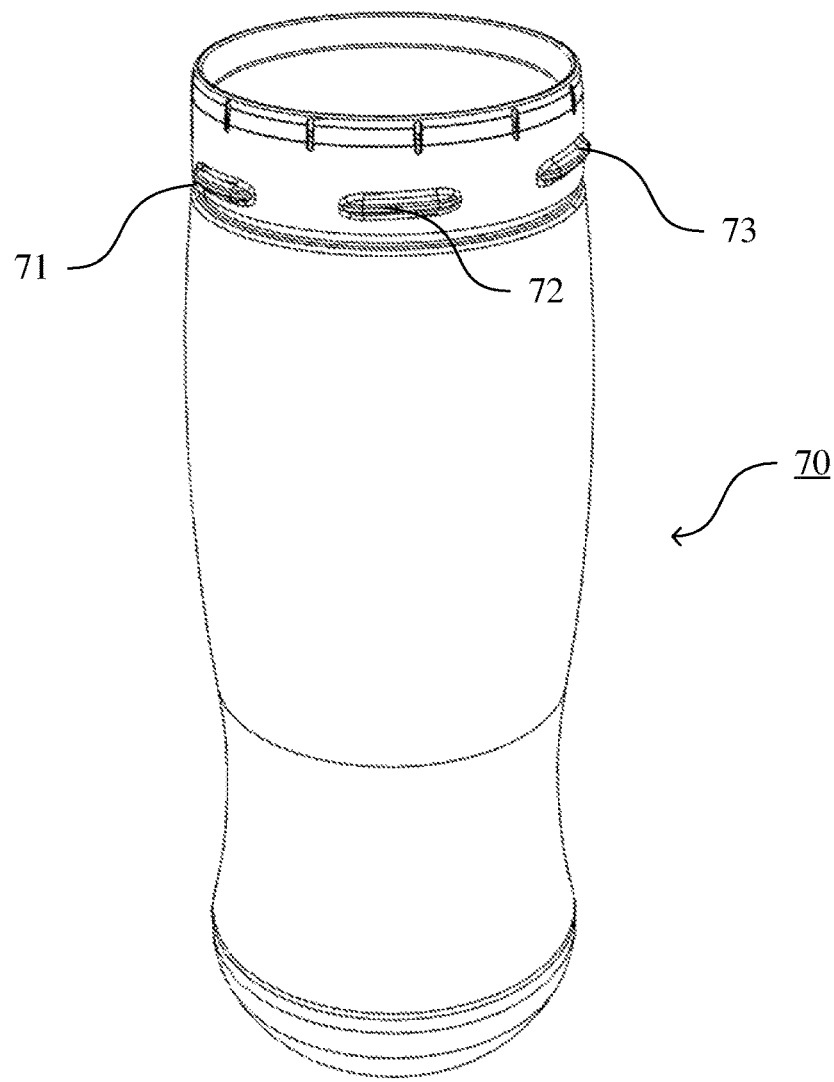
FIGS. 16 and 17 depict a container and a closure, respectively, with an alternative arrangement of thread portions.
Figure 17:
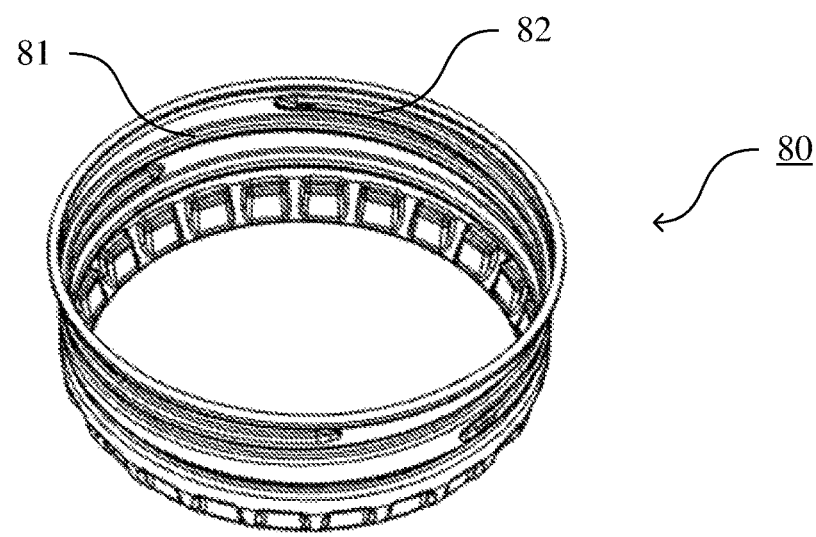

FIGS. 16 and 17 schematically depict a container 70 and a corresponding closure 80 that are largely similar to the arrangements discussed above but have a variation in the arrangement of the thread portions. It will be appreciated that this arrangement of the thread portions may be combined with any of the variations discussed above.

In the arrangement shown, the container 70 has six thread portions. Three thread portions 71, 72, 73 on the side of the container 70 visible in FIG. 16, provide a first, interrupted, thread. The remaining thread portions of the container 70, not visible in FIG. 16, form a second interrupted thread. As shown, the thread portions of the container 70 are arranged such that none of the thread portions of the container forming the interrupted threads overlap another thread portion of the container 70. In other words no part of any one thread portion is arranged above a part of another thread portion, or above a part of a virtual thread formed by two or more other thread portions, in the direction of the opening axis.

FIG. 17 depicts a closure 80 to be used in conjunction with the container 70 shown in FIG. 16. As shown, in this arrangement, the closure 80 has thread portions that form two continuous threads 81, 82. When the closure 80 engages with the container 70, each of the continuous threads 81, 82 of the closure respectively engage with the thread portions that form one interrupted thread on the container 70.

Figure 18:
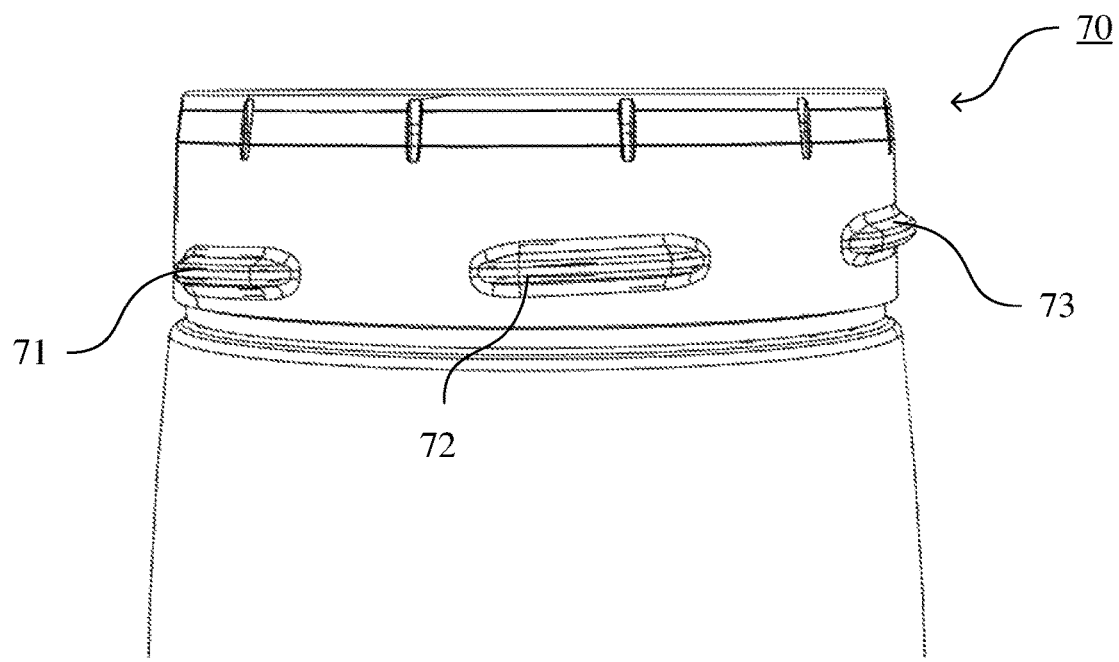
FIG. 18 depicts in elevation the top part of the container of FIG. 16.

FIG. 18 depicts a side elevation of a top part of the container 70 depicted in FIG. 16. In particular, FIG. 18 depicts the thread portions 71, 72, 73 that form a single interrupted thread on the container 70. As shown, the lower edge of the thread portions 71, 72, 73 forming the interrupted threads of the container 70 extend in a direction along the thread at an oblique angle to the opening of the container 70. In an arrangement, the thread portions 71, 72, 73 forming each of the interrupted threads of the container 70 may be arranged to form a virtual helical thread. It will be appreciated that the continuous threads provided within the closure 80 are arranged at a corresponding angle.

It should also be appreciated that, although in the arrangements depicted in FIGS. 16 to 18, the container 70 has six thread portions arranged in such a way that the container 70 is provided with two interrupted threads, other arrangements may be used. Specifically, the container 70 may be provided with thread portions that combine to form any number of interrupted threads and each interrupted thread may be formed of any plurality of thread portions.

In addition to the arrangement depicted in FIGS. 16 to 18, a convenient arrangement of a container 70 may have three interrupted threads, each formed of two thread portions. Alternatively, in a convenient arrangement, a container 70 may have a single interrupted thread formed of three, four, five, six, seven, eight, nine or ten thread portions. In each arrangement, the closure 80 may be provided with a continuous thread corresponding to each of the interrupted threads provided on the container 70.

Providing non-overlapping interrupted threads on the container 70 may enable the provision of an arrangement in which the friction between the thread portions of the container 70 and closure 80 are kept sufficiently low that removing the closure 80 from the container 70 does not become difficult for a user. Alternatively or additionally, the use of one or more interrupted threads on the container 70, namely arrangements having a substantial separation between the thread portions on the container 70 forming the interrupted thread, such as a separation significantly greater than the width of the thread portions, may ensure that additional pressure relief features need not be provided to permit excess gas pressure to pass the thread portions. Alternatively or additionally, providing non-overlapping interrupted threads may reduce the impact on a user drinking from the container of the presence of the thread portions on the container. Alternatively or additionally, minimising the size of the thread portions formed on the container 70 may facilitate the manufacture of the container 70.

In an arrangement, the length of each of the thread portions of the container 70 in a direction along the thread may be approximately the same as the separation between adjacent thread portions. In such an arrangement, the total length of thread portion on the container 70 engaged with one of the continuous threads of a closure 80 connected to the container 70 would represent approximately 50% of the circumference of the container 70. Such an arrangement may provide a good compromise between the desire to minimise the size of the thread portions on the container and the requirement to have sufficient engagement of thread portions that the material of the thread portions formed on the container maintains its integrity under the stresses imparted by the containment of a pressurised beverage within the container 70. In arrangements, the length of the thread portions of the container 70 in a direction along the thread and the separation between them may be configured such that the combined length of the thread portions is in a range of approximately 25% to 75% of the circumference of the container 70.

However, by combining a container 70 having one or more interrupted threads with a closure having corresponding continuous threads makes possible an arrangement in which the closure 80 must be rotated about the opening axis relative to the container 70 by a sufficiently large angle in order to remove the closure 80 that one can reduce the risk of an accidental removal of the closure 80 to an acceptable level.

In this respect, it should be appreciated that, although the thread portions of the container 70 are arranged such that none overlap another thread portion of the container, the thread portions of the closure 80 forming the one or more continuous threads may overlap in order to ensure that they are sufficiently long that the rotation required to remove the closure 80 from the container 70 is sufficiently large. For example, it may be desirable to ensure that the thread portions of the closure forming the continuous threads of the closure extend around at least half of the circumference of the closure. In the arrangement shown in FIG. 17, each of the thread portions 81, 82 forming respective continuous threads on the closure 80, extend almost a complete circumference of the closure 80.

The invention claimed is:

1. A container and a closure for the container, the container having a side surface and a rim that defines an opening and an opening axis that is perpendicular to the opening;
   wherein the closure is configured to close the opening;
   the container and closure have respective thread portions that cooperate to define movement of the closure relative to the container in a direction parallel to the opening axis as the closure rotates about the opening axis relative to the container;
   the closure has a seal, configured to be able to form a fluid-tight seal against the side surface of the container; and
   the thread portions of the container and the closure are configured such that, as the closure rotates relative to the container, the seal is moved in the direction parallel to the opening axis to contact three regions on the side surface of the container, the three regions comprising:
   a first region on the side surface of the container, configured such that, as the seal is moved across the first region, the seal changes between an uncompressed state and a compressed state between the container and closure;
   a second region on the side surface of the container over which the seal remains compressed and comprising at least one groove or ridge configured to prevent the seal from forming a fluid-tight seal against the side surface of the container in the second region; and
   a third region on the side surface of the container on which the seal forms a fluid-tight seal between the side surface of the container and the closure,
   wherein the at least one groove or ridge of the second region extends from at least the first region to at least the third region,
   wherein the thread portions of the container are positioned on the side surface of the container at a location that is further from the rim than the first, second and third regions on the side surface of the container.

2. The container and the closure according to claim 1, wherein, when the seal is in contact with the second and third regions of the side surface of the container, the seal remains in the compressed state.

3. The container and the closure according to claim 1, wherein the at least one groove or ridge comprises a plurality of grooves or ridges provided in the second region of the side surface of the container; and the plurality of grooves or ridges are arranged parallel to the opening axis.

4. The container and the closure according to claim 1, wherein the second region of the side surface of the container is configured such that, at each location, a line within the surface is at an angle to the opening axis of less than 10°.

5. The container and the closure according to claim 1, wherein the third region of the side surface of the container is configured such that, at each location, a line within the surface is at an angle to the opening axis of less than 5°.

6. The container and the closure according to claim 1, wherein the first region of the side surface of the container is configured such that, at each location, a line within the surface is at an angle to the opening axis that is in a range of 5 to 30°.

7. The container and the closure according to claim 1, wherein the first region of the side surface is configured such that, as the seal is moved across the first region during a process of connecting the closure to the container, the separation between a part of the closure adjacent the seal and the part of the side surface of the container in contact with the seal decreases.

8. The container and the closure according to claim 1, wherein the container is configured such that, during a process of connecting the closure to the container, the seal is made to pass in succession across the first, second and third regions of the side surface of the container.

9. The container and the closure according to claim 1, wherein the container is configured such that, during a process of removing the closure from the container, the seal is made to pass in succession across the third, second and first regions of the side surface of the container, while the respective threaded portion of the container are engaged with the respective threaded portions of the closure.

10. The container and the closure according to claim 1, wherein the thread portions of the container and the closure are configured such that, during a process of connecting the closure to the container, after the seal has been brought into contact with the third region of the side surface of the container, further rotation of the closure relative to the container about the opening axis does not advance the closure further relative to the container in the direction parallel to the opening axis.

11. The container and the closure according to claim 1, wherein the first, second and third regions of the side surface of the container are formed on an exterior surface of the container.

12. The container and the closure according to claim 1, wherein the first, second and third regions of the side surface of the container are formed on an interior surface of the container.

13. The container and the closure according to claim 1, wherein the closure has a second seal, configured to form a liquid-tight seal against the rim of the container when closure is attached to the container.

14. The container and the closure according to claim 1, wherein the thread portions of the container are configured to provide at least a first thread, formed from separate thread portions to form at least one interrupted thread;
   none of the thread portions of the container forming the at least one interrupted thread overlap other thread portions of the container;
   the thread portions of the closure are configured to provide at least one continuous thread extending about at least one full circumference of the closure, arranged such that, when the closure closes the opening, the at least one continuous thread of the closure engages with the at least one interrupted thread of the container.

15. The container and the closure according to claim 14, wherein the at least one continuous thread comprises a single continuous thread, and wherein the single continuous thread engages the at least one interrupted thread of the container as the seal is moved across the second region.

16. The container and the closure according to claim 1, wherein at least one seal is formed from a resilient material.

17. The container and the closure according to claim 1, wherein the seal is one of an O-ring, D-ring, U-ring, V-ring or square ring.

18. The container and the closure according to claim 1, wherein the opening of the container has width in the range of from 40 to 90 mm.

19. A method of filling a container with a beverage, comprising filling the container with a beverage and connecting a closure to an opening of the container, wherein the container and the closure are the container and the closure according to claim 1.

20. The method of forming the closure according to claim 19, comprising forming a main body of the closure having a top portion for covering the opening of the container and a skirt extending from the top portion; and forming at least one seal by co-molding the seal to the main body.

\* \* \* \* \*